United States Patent [19]

Burgeson

[11] Patent Number: 5,155,950
[45] Date of Patent: Oct. 20, 1992

[54] TICK REPELLANT BELT

[76] Inventor: John R. Burgeson, 4345 - 157th Ave. NW., Anoka, Minn. 55304

[21] Appl. No.: 660,207

[22] Filed: Feb. 25, 1991

[51] Int. Cl.$^5$ .................. A01M 1/14; A01M 31/00; A01K 27/00; A41F 9/00
[52] U.S. Cl. ........................................ 43/121; 43/1; 119/106; 119/156; 2/311
[58] Field of Search ............. 43/121, 107, 108, 1, 43/134, 132.1, 124, 120; 224/222, 252; 2/311, 338, 94; 119/143, 156, 106

[56] References Cited

U.S. PATENT DOCUMENTS

| | | | |
|---|---|---|---|
| 233,414 | 10/1880 | Hays | 2/338 |
| 727,054 | 5/1903 | Arndt | 43/1 |
| 989,325 | 4/1911 | Bremer | 43/108 |
| 1,780,407 | 11/1930 | Smith | 224/222 |
| 2,261,360 | 11/1944 | Gerendás | 43/108 |
| 4,048,747 | 9/1977 | Shanahan et al. | 43/114 |
| 4,218,991 | 8/1980 | Cole | 119/106 |
| 4,224,901 | 9/1980 | Carey, Jr. | 119/106 |
| 4,350,122 | 9/1982 | Shotwell | 119/106 |
| 4,471,561 | 9/1984 | Lapierre | 43/108 |
| 4,881,671 | 11/1989 | Horton et al. | 43/132.1 |
| 5,003,635 | 4/1991 | Peterson | 2/174 |
| 5,005,215 | 4/1991 | McIlquham | 2/22 |

FOREIGN PATENT DOCUMENTS

| | | | |
|---|---|---|---|
| 1189700 | 7/1985 | Canada | 43/121 |
| 1187774A | 10/1985 | U.S.S.R. | 43/107 |

*Primary Examiner*—Richard K. Seidel
*Assistant Examiner*—Jeanne M. Elpel
*Attorney, Agent, or Firm*—Palmatier & Sjoquist

[57] ABSTRACT

A tick repellant belt to be worn about the waist of an outdoorsman who wears pants with tightly closed cuffs to ward off or trap bloodsucking arachnids. The belt is comprised of a flexible band having outer and inner surfaces and two ends adapted to releasably interlock to secure the band's inner surface tightly against the outdoorsman to prevent ticks from passing upwardly between the band's inner surface and the outdoorsman. A tick barrier means is located on the outer surface which will prevent the tick from moving upwardly onto the outdoorsman beyond the belt. The tick barrier means includes variations of adhesive surfaces, lubricated surfaces, chemical surfaces and electrical conducting surfaces.

5 Claims, 3 Drawing Sheets

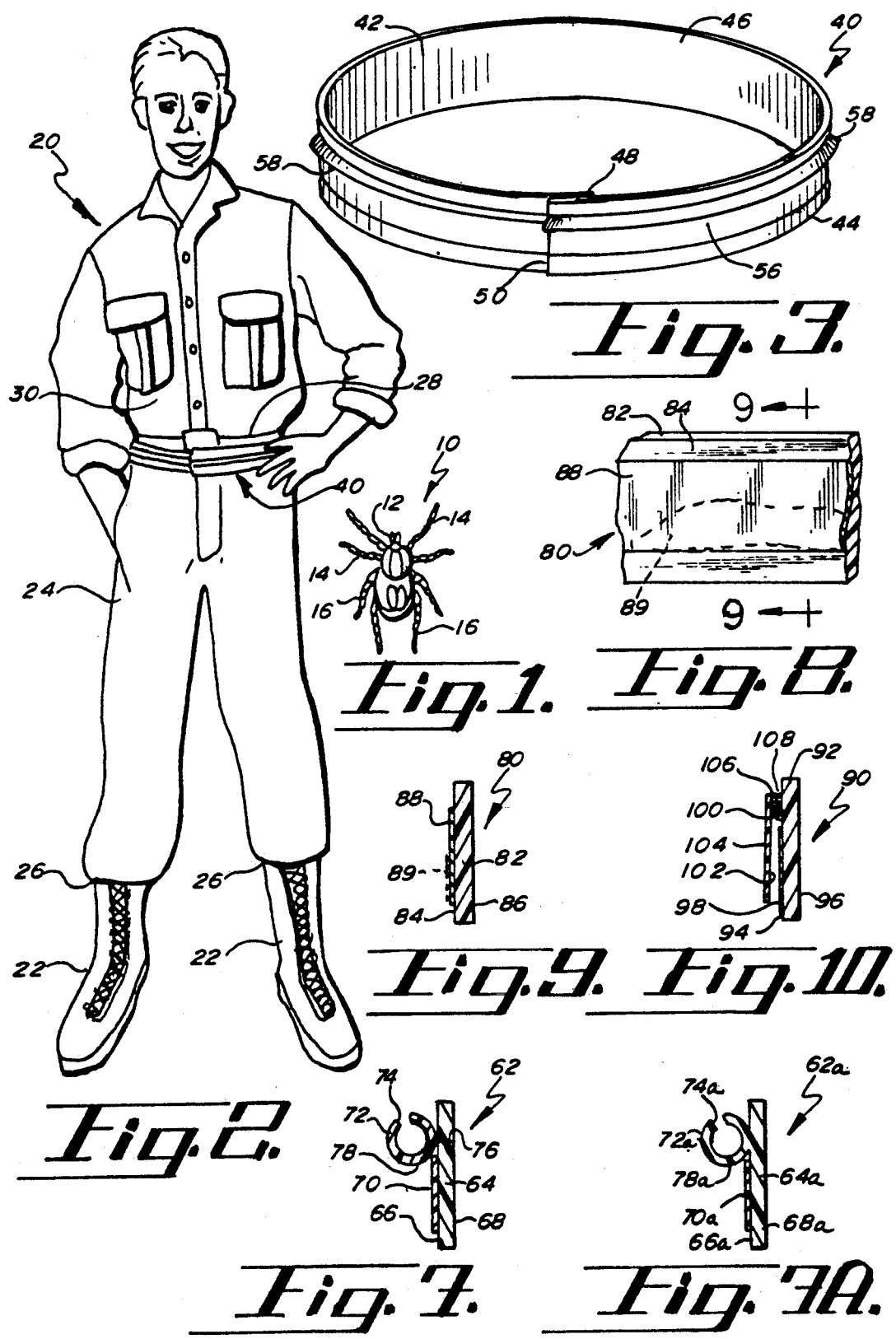

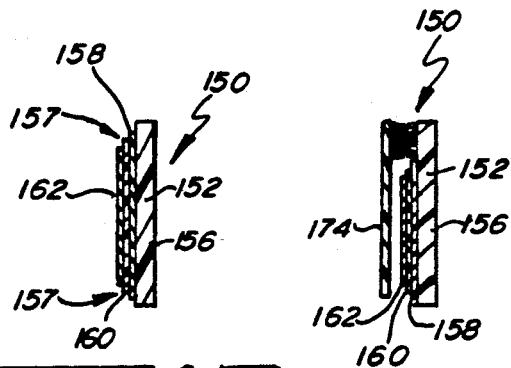
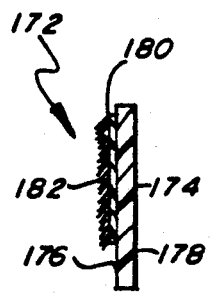
Fig.16. Fig.17. Fig.19.
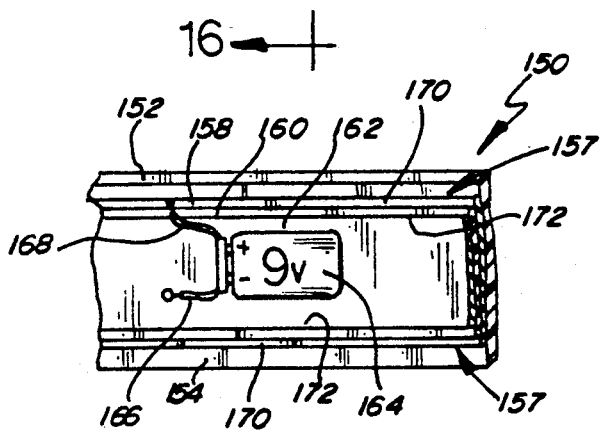
Fig.15.
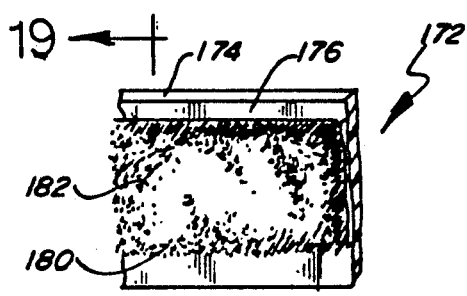
Fig.18.

TICK REPELLANT BELT

BACKGROUND OF THE INVENTION

This invention relates to a tick repellant belt to be worn about the waist of an outdoorsman to ward off bloodsucking arachnids commonly called ticks.

Ticks 10, as shown in FIG. 1, typically have a head 12, front legs 14 and back legs 16. They can be any of numerous arachnids that constitute the acarine super family Iixodoida and are much larger than closely related mites. Ticks are blood suckers which attach themselves to warm blooded vertebrate to feed. Ticks are chiefly important as vectors or carriers of various infectious diseases of man and lower animals. Of serious concern are ticks, particularly the deer tick, which are known to carry a particularly debilitating disease commonly known as a Lyme Disease.

Consequently, hunters and outdoorsman must be particularly concerned that they do not permit ticks that are questing a host to become attached to their body. Although several repellants and insecticides may be useful in discouraging ticks from attaching themselves to the outdoorsman, such chemicals are undesirous to many people and may readily be sensed by various wildlife which is undesirable by hunters.

Referring to FIG. 2, many outdoorsman 20 and hunters have attempted to prevent ticks from attaching themselves to the human body by way of wearing special clothing. Typical clothing worn by the outdoorsman 20 includes heavy boots or shoes 22 with pants 24 that have tightly closed cuffs 26 either by means of tucking the cuffs 26 within the shoes 22 or wearing securing straps about the cuffs 26. At the top of the pants 24, when coveralls are not worn, is typically a waistband 28 wherein the outdoorsman's shirt or jacket 30 is tucked in.

It is known that ticks attach themselves to a host by brushing up against ground vegetation where a tick may be located. Once the tick has attached itself to a host it generally moves upwardly. This is because the tick cannot attach itself to the human body through heavy articles of clothing. Consequently, the tick moves up from the boots or shoes 22 and cuffs 26, which are tightly closed and tucked into boots 22, and approach the waistband 28. At the waistband 18A tick 10 may attempt to get between the pants 24 and shirt 30 to find a body location where it may imbed its head 12 and begin sucking blood. In the case of coveralls, the tick may climb to the front opening, neck or head area of the outdoorsman.

There is a need for a tick repellant belt which may be worn about an outdoorsman's waist which will ward off bloodsucking arachnids who climb upwardly on an outdoorsman's pants.

SUMMARY OF THE INVENTION

A tick repellant belt is worn about the waist of an outdoorsman who wears pants with tightly closed cuffs to ward off or trap bloodsucking arachnids. The belt is comprised of a flexible band having outer and inner surfaces and two ends adapted to releasably interlock to secure the band's inner surface tightly against the outdoorsman to prevent ticks from passing upwardly between the band's inner surface and the outdoorsman. A tick barrier means is located on the outer surface which will prevent the tick from moving upwardly onto the outdoorsman beyond the belt. The tick barrier means includes variations of adhesive surfaces, lubricated surfaces, chemical surfaces and electrical conducting surfaces.

A principal object and advantage of the present invention is that it prevents upwardly climbing ticks or bloodsucking arachnids to climb beyond the belt in an effort to get inside of clothing and imbed its head into the flesh of its host and suck blood.

Another object and advantage of the present invention is that it is easily adorned by the outdoorsman in a comfortable manner without the need for offensive chemicals or insecticides to ward off ticks. Such chemicals or insecticides may alert and alarm wildlife or may be considered harmful or offensive to the outdoorsman.

Another object and advantage of the present invention is that it is simple to manufacture, effective by various tick repelling means and is readily adjustable for various outdoorsmen.

BRIEF DESCRIPTION OF THE DRAWINGS

FIG. 1 is a top view of a tick or bloodsucking arachnid;

FIG. 2 is an elevational view of a typical outdoorsman donning a tick repellant belt;

FIG. 3 is a perspective view of the tick repellant belt of the present invention;

FIG. 7 is a cross sectional view taken along lines 7—7 of FIG. 6;

FIG. 7A is a cross sectional view of a modified belt similar to FIG. 7;

FIG. 8 is a front elevational view of another modified tick repellant belt broken away;

FIG. 9 is a cross sectional view taken along lines 9—9 of FIG. 8;

FIG. 10 is a cross sectional view similar to FIG. 9 including a removable awning;

FIG. 15 is a front elevational view of another modified tick repellant belt broken away;

FIG. 16 is a cross sectional view taken along lines 16—16 of FIG. 15;

FIG. 17 is a cross sectional view similar to FIG. 16 with a removable awning attached to the belt;

FIG. 18 is a front elevational view of a modified tick repellant belt broken away; and FIG. 19 is a cross sectional view taken along lines 19-19 of FIG. 18.

DETAILED DESCRIPTION OF THE PREFERRED EMBODIMENT

Figure 4:
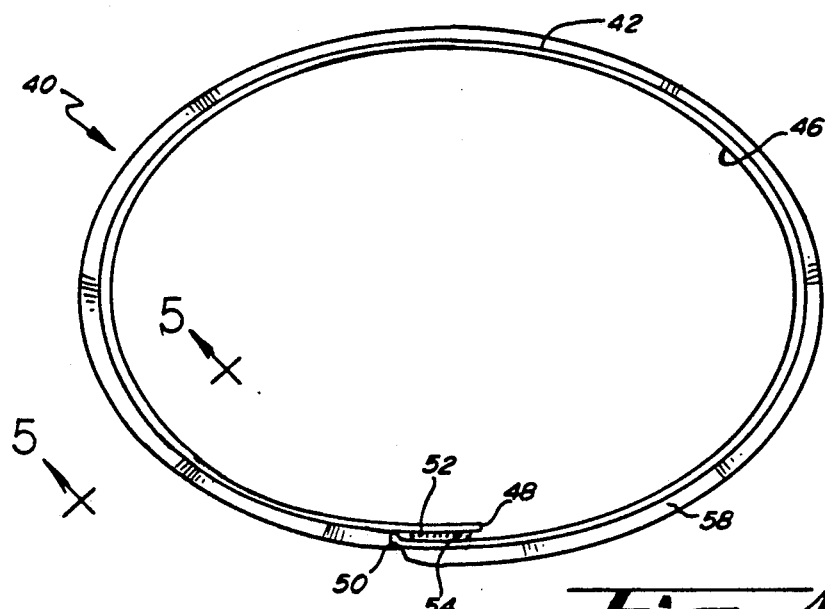
FIG. 4 is a top plan view of the invention.
Figure 5:
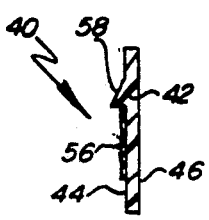
FIG. 5 is a cross sectional view of the invention taken along lines 5-5 of FIG. 4.

Referring to FIGS. 3, 4 and 5, one embodiment of the tick repellant belt 40 may be seen. Belt 40 is suitably made up of vinyl or other flexible wear resistant material shaped in the form of a band 42 which may be extruded. Band 42 has an outer surface or outside 44 and an inner surface or inside 46. Band 42 has two distil ends 48 and 50. Ends 48 and 50 have complimentary hook and loop pads 52 and 54 suitably attached thereto as shown for fixing belt 40 about and slightly below the waistband 28 of an outdoorsman 20. Hook and loop pads 52 and 54 suitably may be made of VELCRO ®. Other means, such as buckles, may be used to secure ends 48 and 50.

One form of a tick barrier means to be applied to belt 40 includes a double sided adhesive tape 56. One suitably known two-sided adhesive tape 56 is manufactured by Minnesota Mining and Manufacturing (3M) of St. Paul, Mn. 55144 and is identified by product No. 9425.

One side of tape 56 is appropriately affixed along the entire length of outer surface 44 of band 42 as shown.

Once the belt 40 has been secured about the waist of an outdoorsman, ticks crawling across the outer surface 44 and contacting the double sided tape 56 becomes stuck or adhered to the tape thereafter being trapped unable to move upward or downward on the outdoorsman 20. After the tape 56 has lost its adhesive qualities 56 or has become encumbered with various objects or ticks, the tape 56 may be removed from the outer surface 44 of band 42 and replaced with a fresh strip of tape 56.

It has also been found that an awning 58 suitably located above the tape 56 protects and preserves the adhesive quality of the tape 56. Awning 58 deflects or prevents the contact of various objects which otherwise may come into contact with the tape from above including the outdoorsman's 20 fingers (FIG. 2). The awning 58 suitably may be integral or unitarily molded or extruded with band 42 out of vinyl or other suitable plastics.

Figure 6:
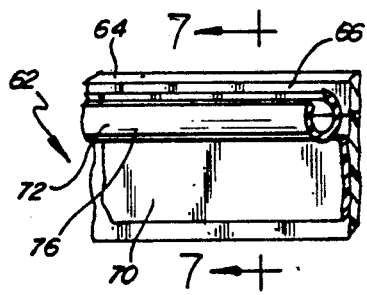
FIG. 6 is a front elevational view of a modified tick repellant belt broken away.

Referring to FIGS. 6, 7 and 7a, modified tick repellant belts 62 and 62a are shown. Belt 62 includes band 64 having outer and inner surfaces 66 and 68. The tick barrier means of modified belt 62 may comprise a double sided tape 70 previously disclosed in combination with awning 72 which suitably may be a vinyl tube having an elongate opening or slit therein. Tube 72 is annular in cross section and appropriately has been found to work well with an outer diameter of three-eighths of an inch and an inner diameter of one-quarter inch. The elongate opening or slit 74 is for stitching 76 to be applied through tube 72 and band 64 as shown in FIG. 7. Belts 62 and 62a are the same with the exception that awning 72a is integrally molded or extruded with band 64a as shown in FIG. 7a. The tube 72 has a smooth outer surface 78 which may assist in deflecting objects from coming into contact with double sided tape 70.

Referring to FIGS. 8 and 9, a modified tick repellant belt 80 may be seen comprised of a band 82 made from plastic or other suitable material having an outer surface 84 and an inner surface 86. Tick barrier means 88 may be a smooth metallic or plastic tape 88 such as a polypropylene tape produced by Alltac of Denver, Co. which is identified by product No. 600. Tape 88 should have an extremely smooth outer surface which may be lubricated by a light mineral oil, silicones or other such lubricants 89 which make it difficult for the tick 10 to crawl upwardly over the band 82 with either of its front or rear legs 14 or 16 due to the tick 10's inability to grab hold of the lubricated smooth surface of tape 88.

Referring to FIG. 10, the modified tick repellant belt 90 is similar to that of belt 80 including band 92 having outer and inner surfaces 94 and 96. The tick barrier means similarly includes tape 98 which may be double sided adhesive tape or a smooth slick tape. An awning or canopy 100, having an inner side 102 and an outer side 104, may suitably be affixed to the outer surface 94 of band 92 above tape 98 by way of complimentary hook and loop pads 106 and 108 to make awning 100 removable. The inner side 102 of awning 100 also may be coated with a lubricant to thwart the ticks efforts to grab hold and climb over the tick repellant belt 90.

Figure 11:
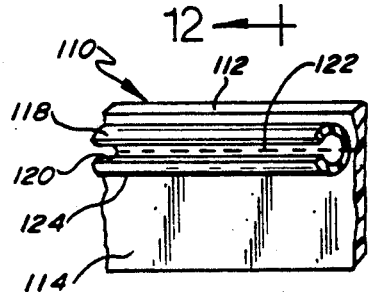
FIG. 11 is a front elevational view of another modified tick repellant belt broken away.
Figure 12:
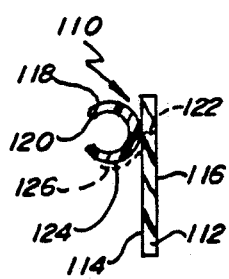
FIG. 12 is a cross sectional view taken along lines 12—12 of FIG. 11.

Referring to FIGS. 11 and 12, another modified tick repellant belt 110 is shown. Belt 110 includes band 112 having an outer surface 114 and an inner surface 116. The tick barrier means is comprised of a tube 118, as previously disclosed, having an elongate opening or slit 120 therein. Tube 118 is affixed to the outer surface 114 of band 112 suitably by way of stitching 122 which may be applied through slit 120. Tube 118 again has a smooth outer surface 124 which makes it difficult for the tick to rear up on its back legs 116 and attempt to climb over tube 118 after it has been unsuccessful in attempting to squeeze between the affixed tube 118 and the outer surface 114 of band 112. The smooth surface 124 may be further enhanced by adding a lubricant 126 therealong, such as a light mineral oil as previously discussed.

Figure 14:
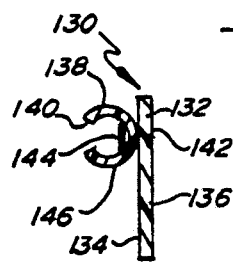
FIG. 14 is a cross sectional view taken along lines 14—14 of FIG. 13.
Figure 13:
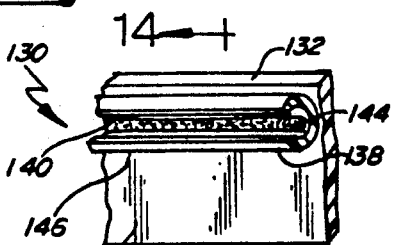
FIG. 13 is a front elevational view of another modified tick repellant belt broken away.

Referring to FIGS. 13 and 14, another modified tick repellant belt 130 is shown comprised of band 132 which has out and inner surfaces 134 and 136. The tick barrier means again includes a tube 138 which has elongate opening or slit 140 therein. Tube 138 may be affixed to band 132 by way of stitching to be applied through opening 140 or may be extruded therewith. A felt or absorbent material insert strip 144 may be placed within the inside of tube 138 through opening 140 and be treated with a chemical such as an insect repellant or an insecticide. By this arrangement, the chemically treated insert 144 is kept well away from the outdoorsman's body which will assure safe usage for younger people and those who are reactive to such chemicals. Again, the outer tube surface 146 of tube 138 may be smooth and may additionally be coated with a lubricant to further deter and thwart a tick from climbing over tube 138.

Referring to FIGS. 15 and 16, another modified tick repellant belt 150 is shown and includes band 152 with outer and inner surfaces 154 and 156. The tick barrier means of belt 150 is comprised of an open electrical circuit 157 which is comprised of a first conductive tape or layer 158, an insulating tape or layer 160 and a second conductive tape of layer 162. A 9 volt battery 164 is appropriately mounted on band 152 and has a negative wire lead 166 connected to second or outer conductive layer 162 and a positive wire lead 168 connected to first or inner conductive tape 158. By this arrangement, conductive layers 158 and 162 appropriately have adjacent edges 170 and 172, respectively. When edges 170 and 172 are attempted to be crossed by tick 10 the electrical circuit 157 is closed which either repels or kills the tick 10. As seen in FIG. 17, a removably nonconductive awning 174 may be affixed about band 152 by way of hook and loop pads previously discussed.

Referring to FIGS. 18 and 19, another modified tick repellant belt 172 may be seen. Belt 172 includes a band 174 having outer and inner surfaces 176 and 178. Outer surface 176 may have a tick barrier means of the type to include a tape 180 which supports downwardly projecting spikes 182 which are difficult if not impossible for the tick 10 to crawl over.

The setup, donning and operation of the above embodiments can now readily be appreciated. The outdoorsman initially sizes the band and affixes the hook and loop pads to the ends of the band. Next, the adhesive strips, lubricant, insert strip and/or electrical connections are set up. Thereafter, the outdoorsman simply dons the belt just below the waistband opening 28 to assure that ticks cannot crawl over the belt and attempt to lodge themselves on the outdoorsman's body by gaining access about the waistband.

The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention.

What is claimed:

1. A tick repellant belt to be worn about the waist of an outdoorsman who wears coveralls or pants with tightly closed cuffs to ward off bloodsucking arachnids, comprising:
   (a) a flexible band having outer and inner surfaces and two ends adapted to releasably interlock to secure the band's inner surface tightly against the outdoorsman so that ticks may not pass upwardly between the band's inner surface and the outdoorsman; and
   (b) tick barrier means comprised of a two-sided adhesive tape affixed about the outer surface exposing one side of the tape which will prevent the tick from moving upwardly on the outdoorsman beyond the belt and an awning on the bank outer surface above the tape which will protect and preserve the adhesive quality of the exposed side of the adhesive tape.

2. A tick repellent belt to be worn about the waist of an outdoorsman who wears coveralls or pants with tightly closed cuffs to ward off bloodsucking arachnids, comprising:
   (a) a flexible band having outer and inner surfaces and two ends adapted to releasably interlock to secure the band's inner surface tightly against the outdoorsman so that ticks may not pass upwardly between the band's inner surface and the outdoorsman;
   (b) tick barrier means on the outer band surface comprising a smooth surface with a coating of a lubricant thereon which will prevent the tick from getting traction and moving upwardly on the outdoorsman beyond the belt; and
   (c) an awning on the band outer surface above the lubricated smooth surface which will protect and preserve the slipping quality of the lubricated smooth outer band surface.

3. A tick repellant belt to be worn about the waist of an outdoorsman who wears coveralls or pants with tightly closed cuffs to ward off bloodsucking arachnids, comprising:
   (a) a flexible band having outer and inner surfaces and two ends adapted to releasably interlock to secure the band's inner surface tightly against the outdoorsman so that ticks may not pass upwardly between the band's inner surface and the outdoorsman; and
   (b) tick barrier means on the outer band surface comprising a tube with a smooth outer tube surface affixed to the outer band surface with a coating of a lubricant thereon which will prevent the tick from getting traction and moving upwardly on the outdoorsman beyond the belt.

4. The tick repellant belt of claim 3 wherein the tube has an elongate opening therein running the length of the tube and the band.

5. A tick repellant belt to be worn about the waist of an outdoorsman who wears coveralls or pants with tightly closed cuffs to ward off bloodsucking arachnids, comprising:
   (a) a flexible band having outer and inner surfaces and two ends adapted to releasably interlock to secure the band's inner surface tightly against the outdoorsman so that ticks may not pass upwardly between the band's inner surface and the outdoorsman; and
   (b) tick barrier means on the outer band surface comprising a tape with adhesive on one side for affixing to the outer surface of the band having downwardly projecting spikes on the other side which will prevent the tick from moving upwardly on the outdoorsman beyond the belt.

* * * * *